Patented Aug. 25, 1942

2,294,259

UNITED STATES PATENT OFFICE 2,294,259

CAPILLARY-ACTIVE AGENT

Adrianus Johannes van Peski and Willem Coltof, Amsterdam, Netherlands, assignors to Shell Development Company, San Francisco, Calif., a corporation of Delaware No Drawing. Application July 24, 1939, Serial No. 286,296. In the Netherlands August 5, 1938

12 Claims. (Cl. 260—485)

This invention relates to novel capillary-active agents which possess excellent wetting, penetrating, cleansing, emulsifying and dissolving properties and consequently are very suitable for treatment of leather, textile, and other materials, together with a process for the preparation of said novel compounds.

It is an object of the present invention to provide capillary-active agents which, due to the nature of their chemical structure, may be made to have characteristic properties which make them eminently suited for many special purposes. A further object of the invention is to provide a practical and economical process for producing said capillary-active agents.

In accordance with the invention the capillary-active agents are neutral or acid esters obtained by reaction of substituted succinic acids or their anhydrides, wherein the substituents are alkyl or alkenyl groups, with epoxy or hydroxyl compounds, or their salts. These capillary-active agents were found to be valuable ingredients for baths used to improve vegetable, animal and artificial fibres, leather, and various other materials in every stage of their manufacture or treatment.

A suitable choice of the substituted succinic acids or their anhydrides and of the epoxy or hydroxyl compounds with which they are reacted enables the preparation of products having the most suitable properties for the purpose to which they are applied. For example, these capillary active agents may be made to have properties so that they come especially into consideration in aqueous media or they may be made to have properties making them most desirable for use in non-aqueous media.

The possibility of variations in properties is due to the presence of two carboxyl groups in the molecule. Besides being able to vary at will the length and character of the oleophile alkyl or alkenyl side chain in the molecule, the presence of the two carboxyl groups makes possible the linking to them of two oleophile, one oleophile and one hydrophile, or two hydrophile groups of any desired character. A still further variation is possible in being able also to esterify one carboxyl group and to neutralize the other with a base. The products thus may be fitted with properties especially useful in a variety of applications.

The substituted succinic acids or their anhydrides used in the process of preparing the capillary-active agents are the succinic acids or acid anhydrides containing a hydrogen atom substituted by an alkyl or alkenyl group. These substituted succinic acids or their anhydrides may be conveniently prepared by first condensing maleic acid anhydride with mono-olefines. Any mono-olefine may be used in this step depending upon the type of substituent desired in the molecule. Straight chain type of olefines yield a straight chain type of substituents linked to the resulting substituted succinic acid anhydrides, while branched chain type of olefines give the corresponding branched chain type of substituents. If a chain of short length is desired, the lower olefines may be used such as ethylene, propylene, the butylenes, the amylenes, etc. It is usually desirable to have the oleophile character of the capillary-active agents more pronounced by using higher olefines such as the decylenes, the undecylenes, the dodecylenes, etc. The gases and distillates obtained from the cracking of petroleum are a readily available and inexpensive source of the olefines for condensation with the maleic acid anhydride. Particularly suitable products may be obtained from cracked distillate secured by cracking paraffin wax.

If it is desired to use substituted succinic acids instead of the anhydrides, the anhydrides prepared in the above manner may be hydrated by well-known methods to the acids. Further, if an alkyl substituent is desired rather than an alkenyl, the substituted succinic acid anhydrides or the acids may be hydrogenated under mild conditions so that the side chain is saturated.

According to the process of the invention, the substituted succinic acids or their anhydrides are first used to prepare acid esters of substituted succinic acids. The preparation of these esters is effected in such a manner that the formation of products of the nature of alkyd resins is avoided by conducting the reaction so that elimination of water does not occur. This is accomplished by reacting the substituted succinic acids with epoxy compounds or by using the substituted succinic acid anhydrides with hydroxyl compounds and avoiding the use of acid catalysts. Acid catalysts such as sulfuric acid, aluminum chloride, boron trifluoride and the like are not used since these catalysts also tend to promote the formation of higher molecular products from polyhydric alcohols and epoxy compounds used in the process.

Thus, in the present method of preparing the esters, no elimination of water takes place during the reaction. The reaction may be made to proceed without the use of a catalyst, although if one is desired, an alkaline reacting substance may be used such as an alkali metal salt of a higher mono- or polycarboxylic acid. Suitable salts of carboxylic acids which may be used as catalysts include sodium and potassium salts of fatty acids such as sodium caprylate, sodium caprate, potassium undecylate, sodium laurate, potassium myristate, potassium pentadecylate, sodium palmitate, sodium margarate, sodium stearate, potassium behenate, sodium oleate, potassium pelargonate, sodium linoleate, potassium ricinoleate as well as sodium and potassium salts of alkyl substituted succinic acids or alkenyl substituted succinic acids, sodium phthalate, sodium benzoate, potassium cinnamate, sodium salicylate, potassium mandelate, sodium trimesate, potassium glutarate, sodium adipate, lithium talomucicate, cesium mesaconate, rubidium muconate, sodium cerotate and the like.

By epoxy compounds are meant organic compounds which contain the characteristic grouping of atoms which may be represented by the general structural formula:

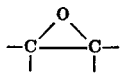

As examples of a few epoxy compounds suitable for use in the process, there may be named ethylene oxide, propylene oxide, butene-1 oxide, butene-2 oxide, isobutylene oxide, butadiene oxide, butadiene dioxide, chloroprene oxide, isoprene oxide, decylene oxide, styrene oxide, cyclohexylene oxide, cyclopentylene oxide, epichlorhydrin, B-methyl epichlorhydrin, glycidol, methyl ether of glycidol, ethyl ether of glycidol, isopropyl ether of glycidol, and the like.

By hydroxyl compounds are meant both the lower and higher aliphatic or aromatic mono- or polyhydric alcohols. As typical examples of suitable compounds may be mentioned methyl alcohol, ethyl alcohol, isopropyl alcohol, allyl alcohol, secondary butyl alcohol, tertiary butyl alcohol, secondary decanol, secondary docenanol, benzyl alcohol, geraniol, terpineol, cyclopentanol, cyclohexanol, bornyl alcohol, ethylene glycol, propylene glycol, trimethylene glycol, isobutylene glycol, dodecylene glycol, cetene glycol, cyclopentylene glycol, cyclohexylene glycol, glycerine, B-methyl glycerine, erythritol, arabitol, and the like together with derivatives containing at least one uncombined hydroxyl group such as glycol monoacetate, glycol monostearate, glycerine mono and dipropionate, glycerine oleostearate, monomethyl ether of ethylene glycol, monoisobutyl ether of propylene glycol monopropyl ether of glycerine, diisoamyl ether of glycerine, ethylene chlorhydrin, isobutylene bromhydrin, glycerine mono and dichlorhydrin, polyglycols, polyglycerols, etc.

The acid ester formation reaction is conducted at substantially elevated temperature, a preferred range being from about 50° C. to about 175° C. Considerable pressure may be developed in the course of the reaction especially if low-boiling reactants are employed. To avoid loss of reactants, the reaction is allowed to proceed under a pressure at least equal to the total vapor pressure of the reaction mixture at the operating temperature.

The product obtained, for example, by reacting a substituted succinic acid anhydride with a hydroxyl compound in the manner of the invention is an acid ester. If a diester type of compound is desired as the capillary-active agent, the remaining carboxylic acid group in the molecule may also be esterified by means of epoxy compounds. The formation of the diester from the acid ester also occurs without the elimination of water.

The acid esters of the substituted succinic acids may be used as such where an agent possessing capillary active properties characteristic of the acid esters is desired, they may be converted to the di-esters as pointed out above or they may be converted to the corresponding salts. Neutralization of the remaining carboxylic acid group in the acid esters may be made with any inorganic or organic base. For example, inorganic bases such as alkali hydroxides including sodium hydroxide, potassium hydroxide, and calcium hydroxide, ammonia and the like may be used. Organic bases such as, for example, methyl amine, diethyl amine, ethylene diamine, mono-, di and trialkylolamines such as ethanolamine, isobutanolamine, aniline, petroleum nitrogen bases, onium bases such as trimethyl phenyl ammonium hydroxide, and the like may be used to neutralize the acid esters.

A convenient way of separating the acid esters from the crude reaction mixture wherein they are formed is to neutralize them with lye solution thus forming the salts and extract the salts from the mixture with ether. The salts which may be separated can be converted again to the acid esters by treatment with strong mineral acid.

The capillary-active agents prepared according to the process of the invention are preferably used in a bath for treatment of materials. These baths may contain various other ingredients which will assist the treatment. In aqueous solution, the di-ester type of products have excellent emulsifying properties both in hard and soft water.

Some of the variety of uses to which the capillary-active agents may be put are the washing and treating of textile fibers, as assistants in fulling and felting operations, in sizing preparations, in delustering fabrics, in the production of finely divided organic and inorganic pigments for paint, lacquer, and ink trades, in greasing, soaking, deliming, bating and dyeing of leather, in the treating of rags and pulp in paper manufacture, in the flotation of ores, in cements, for preventing the dusting of coal, in fire extinguisher preparations, as agents for the production of emulsified asphalts, etc.

Many of the products of the present invention are more or less toxic to lower forms of life and are consequently well suited for use in antiseptics, insecticidal sprays, dairy detergents, etc. When used in such products they may increase the effectiveness through their toxicity as well as their wetting and penetrating action.

For illustrative purposes only, the following examples are submitted to more fully explain the method of preparation of the capillary-active agents and to demonstrate a few of the uses to which these products may be put.

*Example I*

About 50 g. of a mixture of alkenyl succinic acids, equivalent weight=206, obtained by condensation of maleic acid anhydride and a cracking distillate fraction produced by vapor phase cracking of solid paraffin wax and boiling between about 280 and 320° C., followed by hydrolysis, was heated to about 80° C. together with approximately 2.5 g. of the sodium salt of this acid mixture. Subsequently epoxy ethane was introduced until about 11.3 g. thereof had been taken up. By treatment with ether and a lye solution the neutral ester was separated from the acid ester. From the lye solution the acid ester was separated off by acidification with sulphuric acid. The yield was approximately 30.2 g. acid ester, acid figure=128, saponification number=278. 20.9 g. of the acid ester was dissolved in about 114 g. aromatic spindle oil and neutralized while stirring with about 7.5 g. tri-ethanol amine. Thus a solution of the tri-ethanol amine salt in spindle oil of about 20% concentration was obtained in the form of a clear homogeneous syrup. A 20-fold dilution with soft water yielded a highly stable emulsion preservable for several months and applicable for oiling textile materials.

*Example II*

About 900 g. of an alkenyl succinic acid anhydride mixture, equivalent weight=242.6, saponification number=231.3, was mixed with about 334.4 g. of a mixture of secondary $C_{10}$—$C_{12}$ alcohols with an acetyl saponification number=252.5 and an average molecular weight =180.2 and kept for about 48 hours at 120–130° C. in a nitrogen atmosphere while stirring. The mono-esters obtained were precisely neutralized with alcoholic lye. After vaporization approximately 1265.6 g. of the crude sodium salt of the acid esters was obtained. The product was practically completely soluble in ether. An aqueous solution, containing 0.67% of this product, 1.0% Marseilles soap, 0.75% yolk of an egg, and 1.25% neat's-foot oil, was used for greasing leather and compared with a solution containing 1.0 Marseilles soap, 1.5% yolk of an egg and 2.5% neat's-foot oil. While in the latter case the grease content of the treated leather was only 2.35%, the leather being hard, of ugly grain and coarse structure, in the former case, in spite of a considerable saving of neat's-foot oil, a grease content of about 5% was attained, the leather obtained being supple, of beautiful grain and fine structure. In another experiment 0.4% of the product in question, 1% Turkish red oil and 1% neat's-foot oil was found not only to be able to replace 1.5% Marseilles soap, 2% Turkish red oil and 2% neat's-foot oil, but also to yield a much better leather.

*Example III*

About 196.2 g. of an alkenyl succinic acid anhydride mixture, equivalent weight=196.2, saponification number =285.4, was heated for about 36 hours to 120–125° C. in a nitrogen atmosphere with approximately 86.8 g. of 91% secondary decanol (acetyl saponification number=259), while stirring about 60 g. of the product obtained was heated for 60 hours at 100° C. with about 8.85 g. glycidol and approximately 3 g. sodium oleate. Epoxy ethane was introduced at 100° C. into the product obtained, until about 36.4 g. of said substance had been taken up. The secondary decyl polyglycol glyceryl ester of alkenyl succinic acid thus produced was mixed with the 4-fold quantity of aromatic spindle oil. The solution spontaneously emulsified with water to an emulsion of considerable stability. The ester formed also had a very high lime stability. Thus, in water of 250 German degrees hardness an emulsion of an equal stability as in soft water could readily be obtained. The ester can, therefore, be employed in the preparation of soluble oils.

We claim as our invention:

1. A capillary-active agent which is a triethanolamine salt of an acid ester prepared by reacting a substituted succinic acid anhydride wherein the substituent is an alkenyl group containing at least 10 carbon atoms, with an alcohol, said reaction taking place without the elimination of water.

2. A capillary-active agent which is an alkylolamine salt of an acid ester prepared by reacting a compound from the class consisting of substituted succinic acids and substituted succinic acid anhydrides wherein the substituent is a member of the group consisting of the alkyl and alkenyl radicals, with a compound of the class consisting of the organic epoxy compounds and the organic hydroxy compounds containing at least one carbinol group, said acid ester being formed without elimination of water during the reaction.

3. A capillary-active agent which is an alkali metal salt of an acid ester prepared by reacting a substituted succinic acid wherein the substituent is an alkenyl group containing at least 10 carbon atoms, with ethylene oxide.

4. A process for the production of a capillary-active agent which comprises producing an acid ester by reacting a compound of the class consisting of substituted succinic acids and substituted succinic acid anhydrides wherein the substituent is a member of the group consisting of the alkyl and alkenyl radicals, with a compound selected from the group consisting of the organic epoxy compounds and the organic hydroxy compounds containing at least one carbinol group, said selection being such that no elimination of water will occur during the reaction, and neutralizing the acid ester with an alkylolamine.

5. A process for the production of a capillary-active agent which comprises producing an acid ester by reacting a compound of the class consisting of substituted succinic acids and substituted succinic acid anhydrides wherein the substituent is a member of the group consisting of the alkyl and alkenyl radicals, with a compound selected from the group consisting of the organic epoxy compounds and the organic hydroxy compounds containing at least one carbinol group, said selection being such that no elimination of water will occur during the reaction, and neutralizing the acid ester with an alkali metal hydroxide.

6. A process for the production of a capillary-active agent which comprises producing an acid ester by reacting a compound of the class consisting of substituted succinic acids and substituted succinic acid anhydrides wherein the substituent is a member of the group consisting of the alkyl and alkenyl radicals, with a compound selected from the group consisting of the organic epoxy compounds and the organic hydroxy compounds containing at least one carbinol group, said selection being such that no elimination of water will occur during the reaction, and neutralizing the acid ester with a compound selected from the class consisting of inorganic bases and organic bases.

7. A process for the production of a capillary-active agent which comprises reacting a compounds of the class consisting of substituted succinic acids and substituted succinic acid anhydrides wherein the substituent is a member of the group consisting of the alkyl and alkenyl radicals, with a compound selected from the group consisting of the organic epoxy compounds and the organic hydroxy compounds containing at least one carbinol group, said selection being such that no elimination of water will occur during the reaction.

8. A process for the production of a capillary-active agent which comprises producing an acid ester by reacting a compound of the class consisting of substituted succinic acids and substituted succinic acid anhydrides wherein the substituent is a member of the group consisting of the alkyl and alkenyl radicals, with a compound selected from the group consisting of the organic epoxy compounds and the organic hydroxy compounds containing at least one carbinol group, said selection being such that no elimination of water will occur during the reaction, and reacting the acid ester with a compound selected from the class consisting of inorganic bases and organic bases.

9. A capillary-active agent which is an alkali metal salt of an acid ester prepared by reacting a substituted succinic acid wherein the substituent is an alkenyl group containing at least 10 carbon atoms, with an olefine oxide.

10. A capillary-active agent which is an alkali metal salt of an acid ester prepared by reacting a compound from the class consisting of substituted succinic acid and substituted succinic acid anhydrides wherein the substituent contains at least 10 carbon atoms and is a member of the group consisting of the alkyl and alkenyl radicals, with a compound of the class consisting of the organic epoxy compounds and the organic hydroxy compounds containing at least one carbinol group, said acid ester being formed without elimination of water during the reaction.

11. A capillary-active agent which is a salt of an acid ester prepared by reacting a compound from the class consisting of substituted succinic acids and substituted succinic acid anhydrides wherein the substituent contains at least 10 carbon atoms and is a member of the class consisting of the alkyl and alkenyl radicals, with a compound of the class consisting of the organic epoxy compounds and the organic hydroxy compounds containing at least one carbinol group, said acid ester being formed without elimination of water during the reaction.

12. A capillary-active agent which is a salt of a compound selected from the class consisting of inorganic bases and organic bases, and an acid ester prepared by reacting a compound from the class consisting of substituted succinic acids and substituted succinic acid anhydrides wherein the substituent contains at least 10 carbon atoms and is a member of the class consisting of the alkyl and alkenyl radicals with a compound of the class consisting of the organic epoxy compounds and the organic hydroxy compounds containing at least one carbinol group; said acid ester being formed without elimination of water during the reaction.

ADRIANUS JOHANNES van PESKI.
WILLEM COLTOF.